US008279082B2

(12) United States Patent
Machida

(10) Patent No.: US 8,279,082 B2
(45) Date of Patent: Oct. 2, 2012

(54) INTELLIGENT TRANSPORT (IT) SYSTEM USING WIRELESS COMMUNICATION BETWEEN A ROADSIDE DEVICE AND AN IN-VEHICLE DEVICE

(75) Inventor: Mamoru Machida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 12/236,660

(22) Filed: Sep. 24, 2008

(65) Prior Publication Data

US 2009/0189780 A1 Jul. 30, 2009

(30) Foreign Application Priority Data

Jan. 25, 2008 (JP) ................................ 2008-015093

(51) Int. Cl.
*G08G 1/00* (2006.01)

(52) U.S. Cl. ........................ 340/901; 340/905; 455/41.2

(58) Field of Classification Search .................. 340/901, 340/905; 455/41.2
See application file for complete search history.

(56) References Cited

U.S. PATENT DOCUMENTS

| | | | |
|---|---|---|---|
| 2005/0174967 A1 | 8/2005 | Morvan et al. | |
| 2007/0291713 A1 | 12/2007 | Machida | |
| 2008/0090522 A1 * | 4/2008 | Oyama | 455/41.2 |
| 2008/0220767 A1 | 9/2008 | Aretz et al. | |
| 2009/0141674 A1 | 6/2009 | Masuda et al. | |

FOREIGN PATENT DOCUMENTS

| | | |
|---|---|---|
| JP | 2000-082989 A | 3/2000 |
| JP | 2000-082990 | 3/2000 |
| JP | 2002-330142 A | 11/2002 |
| JP | 2006-108891 | 4/2006 |
| JP | 2006-163621 | 6/2006 |
| JP | 2007-110633 | 4/2007 |
| JP | 2007-527133 | 9/2007 |
| JP | 2008-005004 | 1/2008 |
| JP | 2008-098931 A | 4/2008 |
| WO | WO 2005/034434 A1 | 4/2005 |

OTHER PUBLICATIONS

Japanese Office Action mailed Dec. 6, 2011 for corresponding Japanese Application No. 2008-015093, with English-language translation.
Japanese Office Action mailed May 1, 2012 for corresponding Japanese Application No. 2008-015093, with English-language translation.

* cited by examiner

*Primary Examiner* — Thomas Mullen
(74) *Attorney, Agent, or Firm* — Fujitsu Patent Center

(57) ABSTRACT

In order to realize road-road communications, a roadside device is provided with an MS function unit and a BS function unit that have a termination function of a signal. In a case of performing road-road communications, any of plural roadside devices can function as a BS, and others as an MS. In a wireless communication system that only enables wireless communications between MS and BS, road-road communication can be performed. In order to realize vehicle-vehicle communication, an in-vehicle device has the BS function unit and the MS function unit having a termination function of the signal and performs the same operations as the road-road communication. In road-vehicle communication, any of the roadside devices can function as the BS, and other roadside devices and in-vehicle devices are operated as the MS.

8 Claims, 25 Drawing Sheets

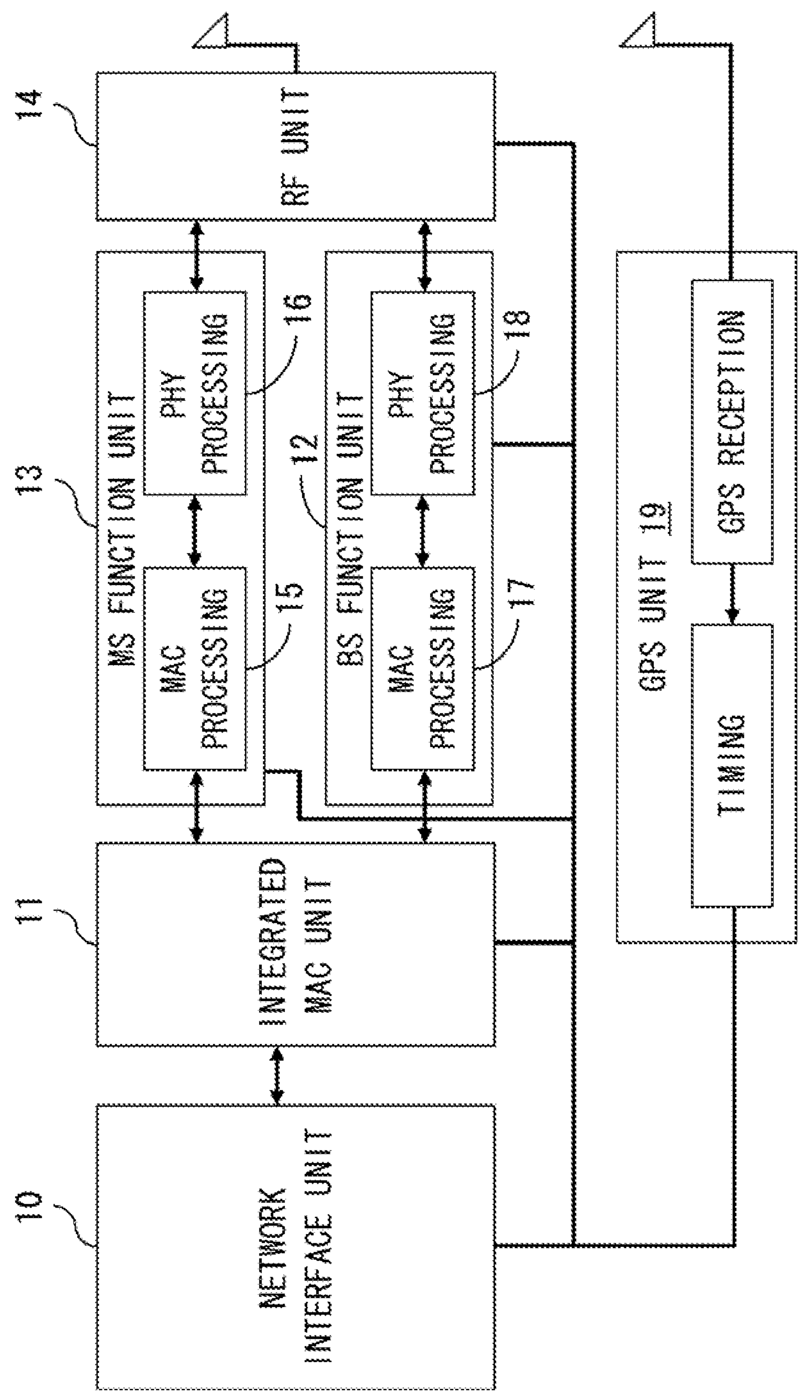
F I G. 2

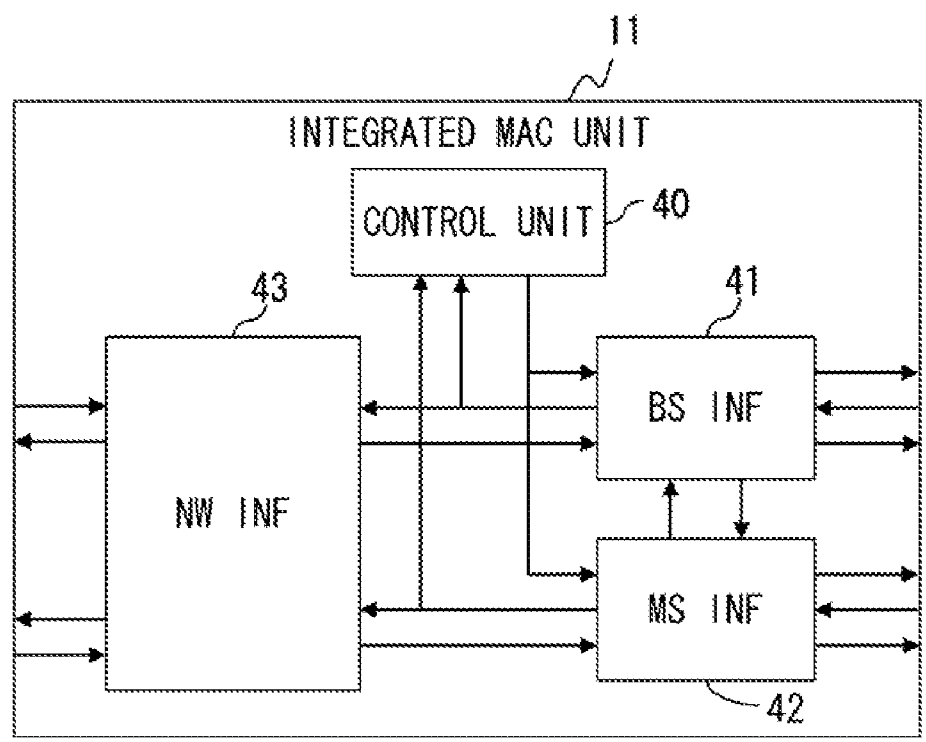
F I G. 3

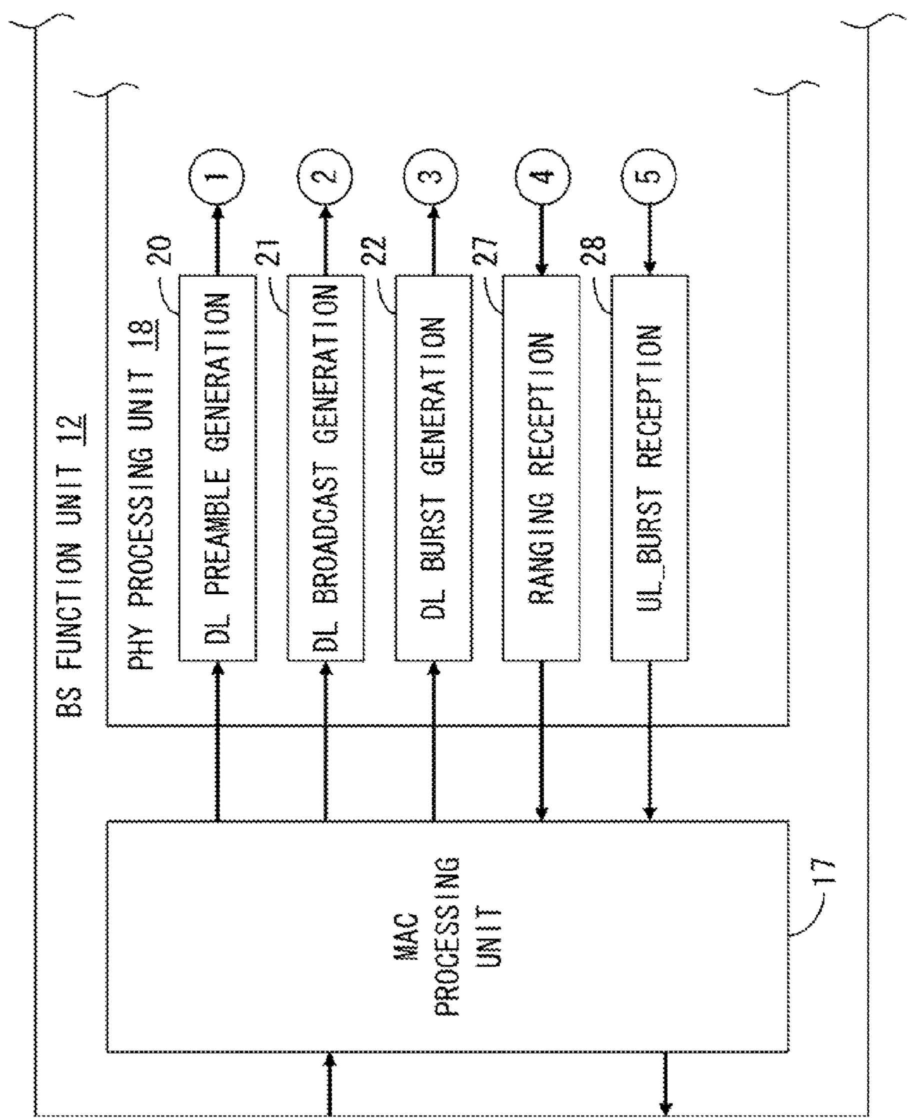
F I G. 4 A

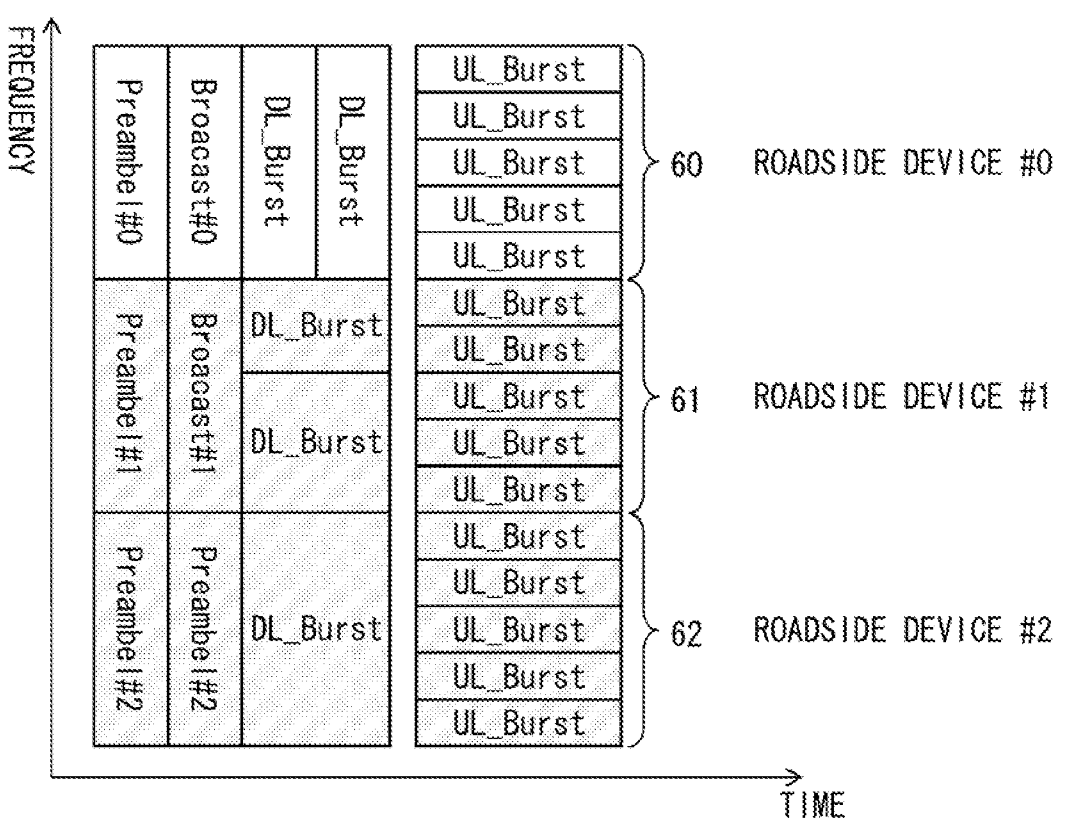
F I G. 9

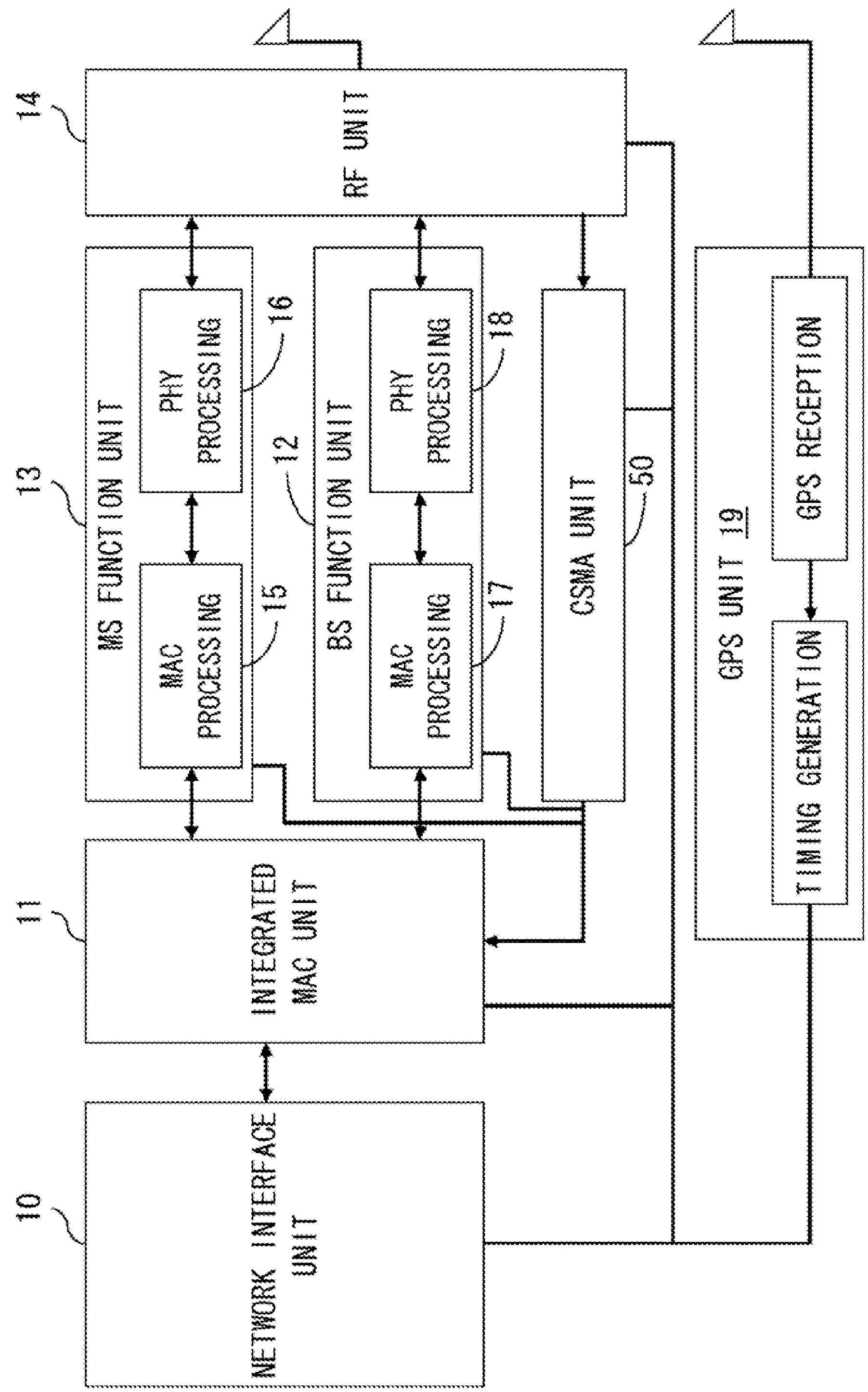
F I G. 1 0

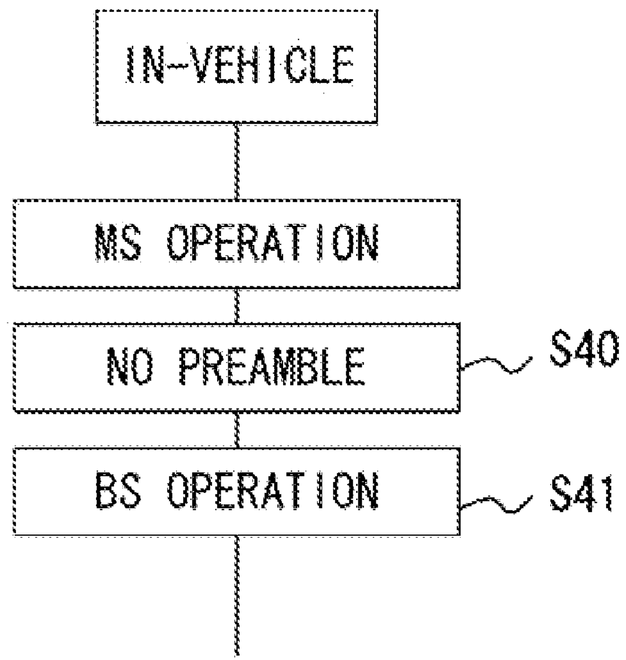
F I G. 1 4

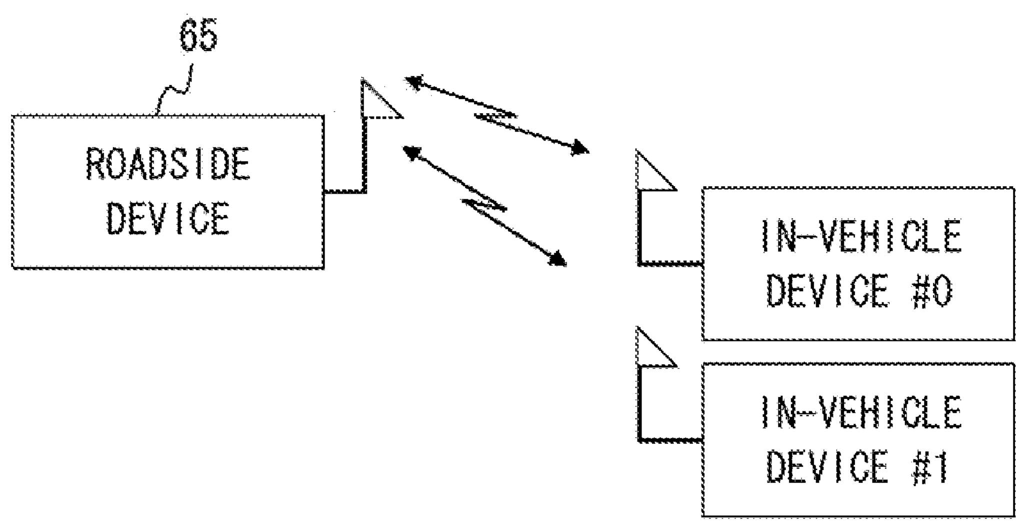
F I G. 1 5

INTELLIGENT TRANSPORT (IT) SYSTEM USING WIRELESS COMMUNICATION BETWEEN A ROADSIDE DEVICE AND AN IN-VEHICLE DEVICE

BACKGROUND OF THE INVENTION

1. Field of the Invention

The present invention relates to an ITS (Intelligent Transport System) realizing road-road communication, which is wireless communication between roadside devices, road-vehicle communication, which is wireless communication between a roadside device and an in-vehicle device, and vehicle-vehicle communication, which is wireless communication between in-vehicle devices.

2. Description of the Related Art

FIG. 1 is a diagram explaining an overview of an Intelligent Transport System (ITS).

An ITS is a system for realizing smoother and safer traffic by exchanging traffic information between an in-vehicle communicator provided in a vehicle and a roadside communicator such as traffic signals provided at a roadside. FIG. 1 illustrates a system configuration of an ITS. ASN-GW (Access Service Network) is connected to a CSN (Connectivity Service Network), an upper-layer device for communication control. A base station 5 and a roadside device 6, which is a key device of communications on the road, are connected to ASN-GW. Other roadside devices and in-vehicle devices are present on the road. These devices communicate with the roadside device 6 while in the communication cell of the roadside device 6. In-vehicle devices are moving at all times and communicate with different roadside devices 6 one after another.

For wireless communications methods to realize such a system, the use of the IEEE standard 802.16 series wireless communication system has been proposed. The 802.16e is a standard relating to a communication method between BS (Base Station) and MS (Mobile Station) in which communications between BS and BS are performed by wired communications. The communication method does not allow one MS to directly communicate with another MS. For that reason, it is difficult to realize road-road communications and vehicle-vehicle communications. The 802.16j standardizes an RS (Relay Station) having a BS function, an MS function and a relay function. However, the Relay Station includes essentially only the relay function, not the real BS function and MS function. Therefore, it is still difficult to realize road-road communications, road-vehicle communications, and vehicle-vehicle communications.

Patent Document 1 discloses a roadside communication apparatus that allows a reduction in system cost.

[Patent Document 1]

Japanese Patent Application Publication No. 2006-163621

SUMMARY OF THE INVENTION

It is an object of the present system to provide an IT system that realizes road-road communication, road-vehicle communication, and vehicle-vehicle communication in a wireless communication system performing wireless communication between a base station and a mobile station.

The present system is an IT system in which a roadside device placed on the side of a road and an in-vehicle device placed in a vehicle exchange information by employing a wireless communication method. The system has a communication apparatus provided both in the roadside device and in the in-vehicle device, and the communication apparatus has base station function means for operating the communication apparatus as a base station, mobile station function means for operating the communication apparatus as a mobile station, and a control means for switching operations of the communication apparatus either as the base station or as the mobile station, and terminates a signal received in either the base station function means or the mobile station function means. The control means operates any one communication apparatus as the base station and operates the other communication apparatus as the mobile station.

According to the present system, an IT system can be provided by providing an additional function to a conventional wireless communication system performing communication only between a base station and a mobile station.

BRIEF DESCRIPTION OF THE DRAWINGS

FIG. 2 is a diagram illustrating a configuration of a roadside device of the present embodiment;

FIG. 3 is a diagram illustrating a configuration of an integrated MAC unit of the present embodiment;

FIG. 9 is a diagram (part 2) explaining an embodiment of a method for assigning a band for road-road communications;

FIG. 10 is a diagram (part 1) explaining an embodiment in which carrier sensing is used for switching of the BS and MS functions;

FIG. 14 is a diagram (part 2) explaining an in-vehicle device of the embodiment;

FIG. 15 is a diagram (part 1) explaining the road-vehicle communication in the embodiment;

DESCRIPTION OF THE PREFERRED EMBODIMENTS

In the present embodiment, an ITS is realized largely without changing the communication method by adding a termination function to the RS function of the standard 802.16j and by adding a parameter required in an ITS to a scheduling function. Note that although the present embodiment is explained under the assumption of employing 802.16j WiMAX, the present embodiment is not limited to this standard. An ITS can be realized by any wireless communication system in which wireless communications between base stations and mobile stations are achieved by providing both the base station function and the mobile station function that have a signal termination function in each of the roadside devices and the in-vehicle devices.

Figure 1:
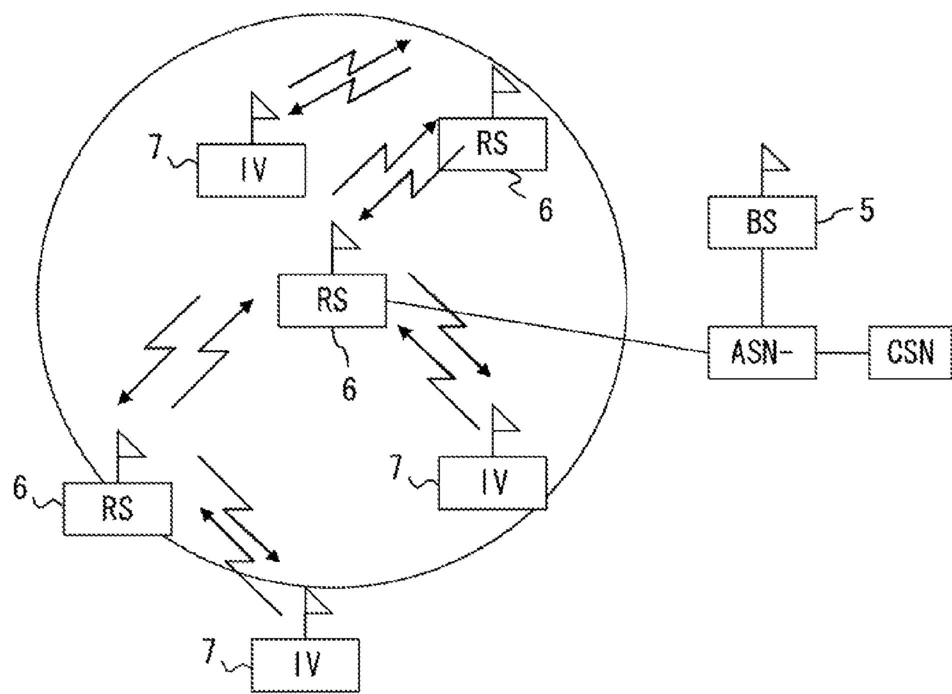
FIG. 1 is a diagram giving an overview of an ITS.
Figure 4B:
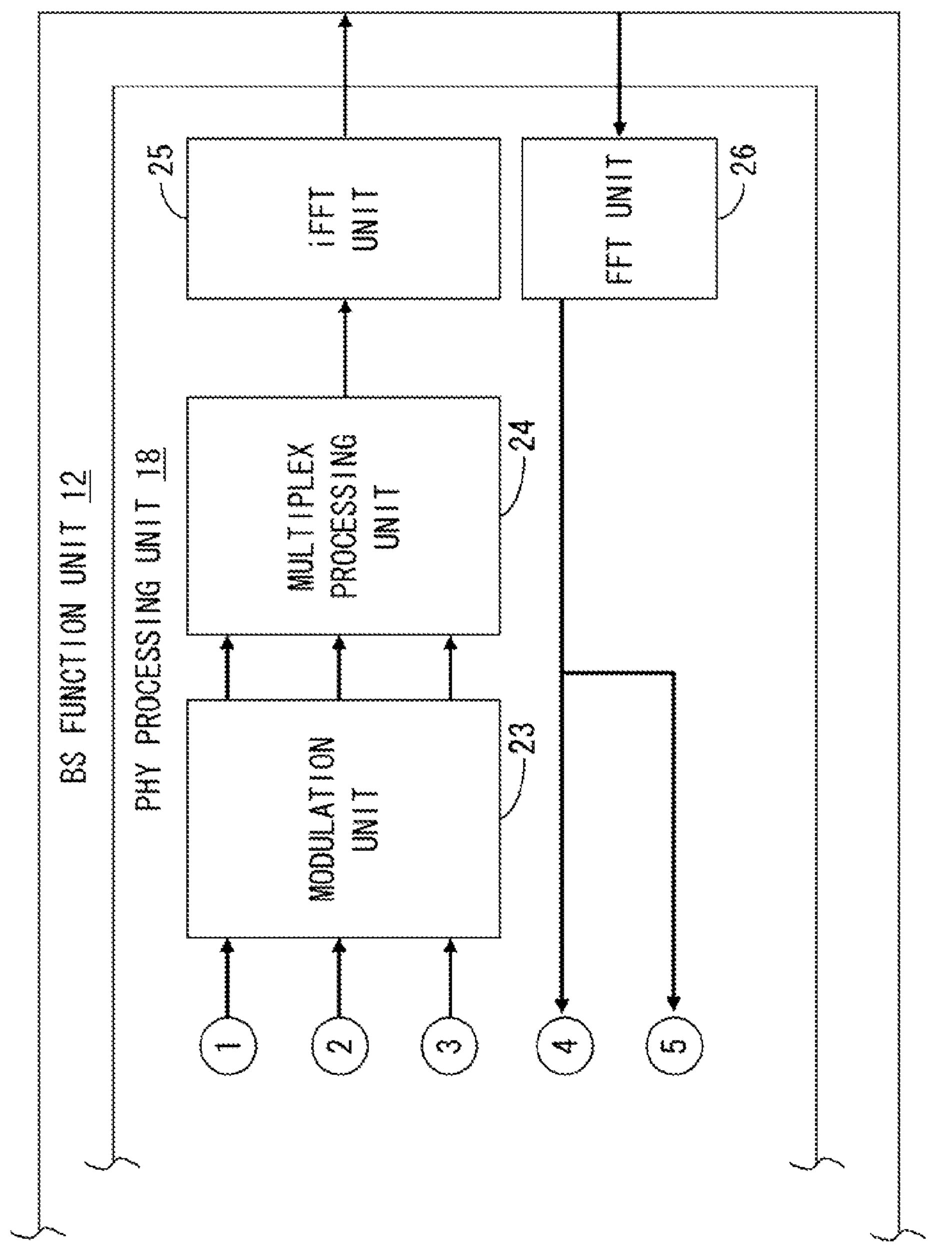
FIG. 4 is a diagram illustrating a configuration of a BS function unit of the present embodiment.
Figure 5A:
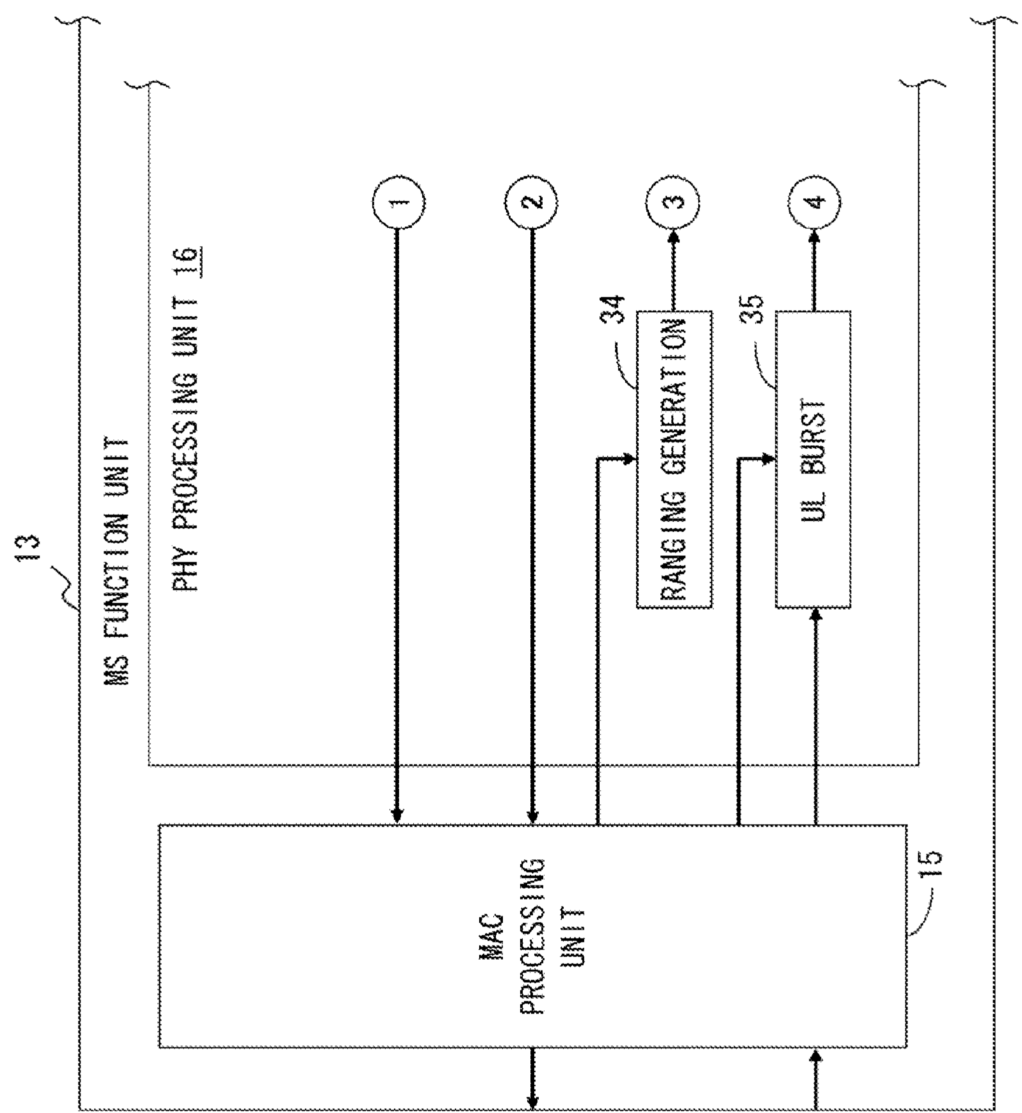
FIG. 5 is a diagram illustrating a configuration of an MS function unit of the present embodiment.
Figure 5B:
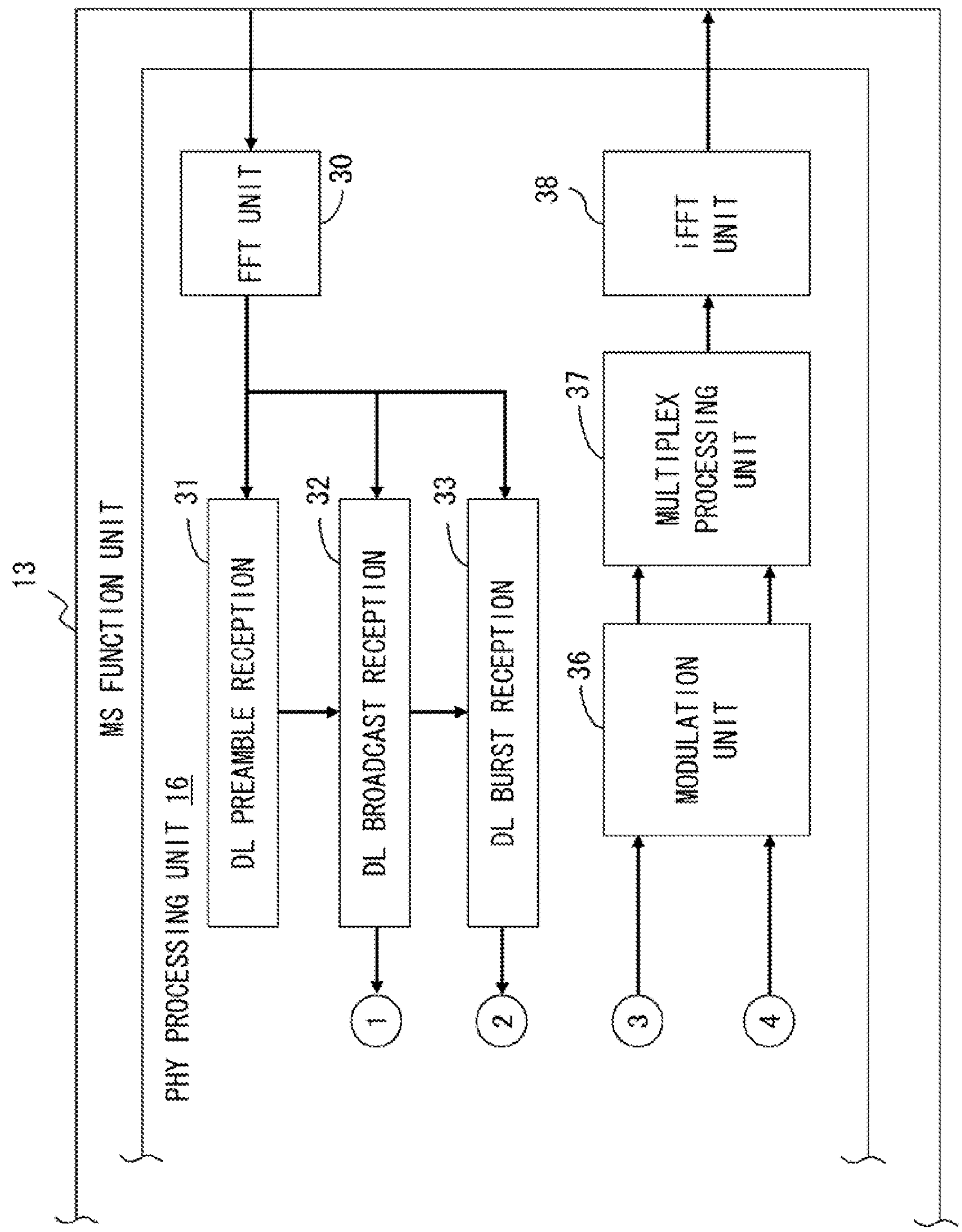

FIG. 2 is a diagram illustrating a configuration of a roadside device of the present embodiment. FIG. 3 is a diagram illustrating a configuration of an integrated MAC unit of the present embodiment. FIG. 4 is a diagram illustrating a configuration of a BS function unit of the present embodiment. FIG. 5 is a diagram illustrating a configuration of an MS function unit of the present embodiment.

In FIG. 2, the roadside device has a network interface unit 10, an integrated MAC unit 11, a BS function unit 12, an MS function unit 13, and an RF unit 14. The network interface unit 10 executes transmission/reception processing of data from another roadside device, transmits information transmitted from the integrated MAC unit 11 to another roadside device, and notifies the integrated MAC unit 11 of information from outside of the roadside device. The integrated MAC unit 11 has a BS function in a master mode, and has an instruction function to activate an MS function in a slave mode. In the master mode, the information received from the network interface unit 10 by the BS function is transmitted by using a down-link format (data format) of the BS function unit 12. Furthermore, the network interface unit 10 is notified of the information received by using an up-link format (data format) of the BS function unit 12. In the slave mode, the information received by the network interface unit 10 by the MS function unit 13 is transmitted by using the up-link format (data format) of the MS function unit 13. Furthermore, the network interface unit 10 is notified of the information received by using the down-link format of the MS function unit 13. A function to transmit information received during the slave mode in the master mode, and a function to transmit information received during the master mode in the slave mode are equipped as relay functions. The relay function is executed in the integrated MAC unit 11.

The BS function unit 12 can be roughly divided into a MAC (Medium Access Control) processing unit 17 and a PHY (PHYsical layer) processing unit 18, and details are shown in FIG. 4. The MAC processing unit 17 has a function related to feedback that connects the down-link and up-link of the BS function unit 12, and a function based on the WiMAX standard such as QoS control. The PHY processing unit 18 has, as a transmission function complying with the WiMAX standard, a function to convert preamble signals (down-link preamble generation unit 20), broadcast signals (down-link broadcast generation unit 21) such as DL_MAP and UL_MAP signals indicating an area of an OFDMA signal instructed by the MAC processing unit, FCH (Frame Control Header) signals, and MAC-processed transmission data into DL_burst signals (down-link burst generation unit 22), a modulation unit 23 for executing the modulation instructed by the MAC processing unit, a multiplex processing unit 24 for performing multiplex processing of each of the signals, and an iFFT unit 25. Functions of the receiver end include an FFT unit 26 for performing FFT processing of signals that are in the baseband level according to the WiMAX standard, a ranging reception processing unit 27 for detecting ranging signals from among the received signals and obtaining synchronization, and a UL_burst reception processing unit 28 for performing reception processing of UL_burst signals in an area instructed by the UL_MAP from the MAC processing unit from among the receiver signals after the synchronization.

The MS function unit 13 is roughly divided into a MAC processing unit 15 and a PHY processing unit 16, and details are described in FIG. 5. The MAC processing unit 15 has a function associated with feedback connecting in the down-link direction and the up-link direction of the MS function unit 13, a QoS control, and a function complying with the WiMAX standard, such as the recognition of areas of the burst signals on the basis of the data from the PHY processing unit.

The PHY processing unit 16 has, as reception functions complying with the WiMAX standard, an FFT unit 30 for performing FFT processing of signals at a baseband level, a down-link preamble processing unit 31 for detecting preamble signals from among the received signals and for synchronizing with the preamble signals, a down-link broadcast signal processing unit 32 for demodulating the broadcast signals, such as DL_MAP and UL_MAP signals, and FCH signals from among the received signals after the synchronization, and a down-link burst signal processing unit 33 for receiving the down-link burst signals. As transmission functions complying with the WiMAX standard, the PHY processing unit has a generation unit 34 for generating ranging signals indicated by the MAC processing unit 15, an up-link burst reception processing unit 35 for converting the MAC-processed transmission data into UL_burst signals, a modulation unit 36 for executing the modulation as instructed by the MAC processing unit, a multiplex processing unit 37 for performing multiplex processing of each of the signals, and an iFFT processing unit 38.

The RF unit 14 has a transmission/reception function for RF modulation of baseband signals of the PHY processing units 16 and 18 or for demodulation of the RF signals into baseband signals.

A GPS unit 19 has functions to generate timing signal, position information, and time information based on signals received from satellites and to notify each unit in FIG. 2, such as the network interface unit 10, integrated MAC unit 11, MS function unit 13, BS function unit 12 and RF unit 14, of the information.

The integrated MAC unit 11 is a processing unit of signals by logic, and the details are described in FIG. 3. A control unit 40 is a processing unit for storing programs for processing signals and executing the programs. A BS interface 41, an MS interface 42, and an NW (Network) interface 43 are interfaces of the NS function unit 12, the MS function unit 13, and the network interface unit 10, respectively.

The network interface unit 10 has a function as an interface with ASN-GW, and the NW-INF 43 of the integrated MAC unit 11 has a function for passing data to either the BS end or the MS end in the device. The network interface unit 10 has a termination function and is able to transmit the data from ASN-GW to the integrated MAC unit 11 and is also able to transmit the data received from the wireless paths to ASN-GW if necessary. The NW-INF 43 is one of the functions in the integrated MAC unit 11, and switches the BS-INF 41 and the MS-INF 42 in the integrated MAC unit 11 to transmit/receive data, depending on whether transmitting/receiving is performed as the BS function or as the MS function, which is determined by the instructions of the control unit in the integrated MAC unit 11.

Figure 6:
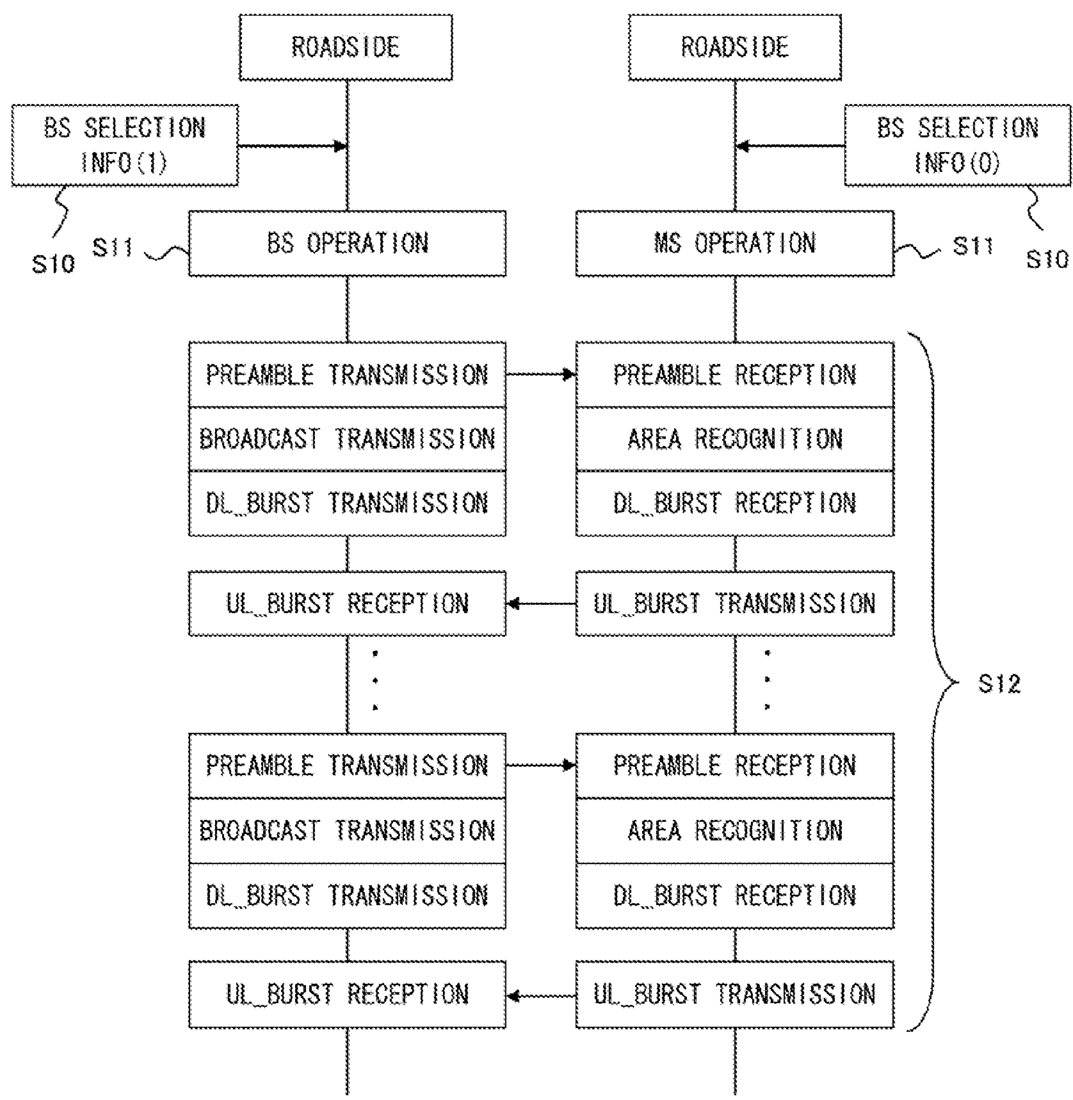
FIG. 6 is a flowchart showing the processing of road-road communications between roadside devices.

FIG. 6 is a flowchart showing the processing of road-road communications between roadside devices.

FIG. 6 shows operations that the control unit of the integrated MAC unit performs. As BS selection information, a pattern is predetermined as 1=BS and 0=MS (S10), for example. The roadside devices are assigned either a BS task or an MS task (S11), and communication is performed (S12). In FIG. 6, information is input so that a roadside device #1 serves as BS and a roadside device #2 serves as MS. The roadside device #1 operating as BS transmits a preamble including information on which band is used in the communication to the roadside device #2 operating as MS. The roadside device #2 recognizes an area in the band used in the communication and receives DL_burst signals transmitted from the roadside device #1. The roadside device #2 also transmits UL_burst signals to the roadside device #1 by using the recognized area in the band. The operations are the same in the following processes.

Assignment of the BS task and the MS task to a roadside device is determined depending on the geographical position of the roadside device.

Figure 7:
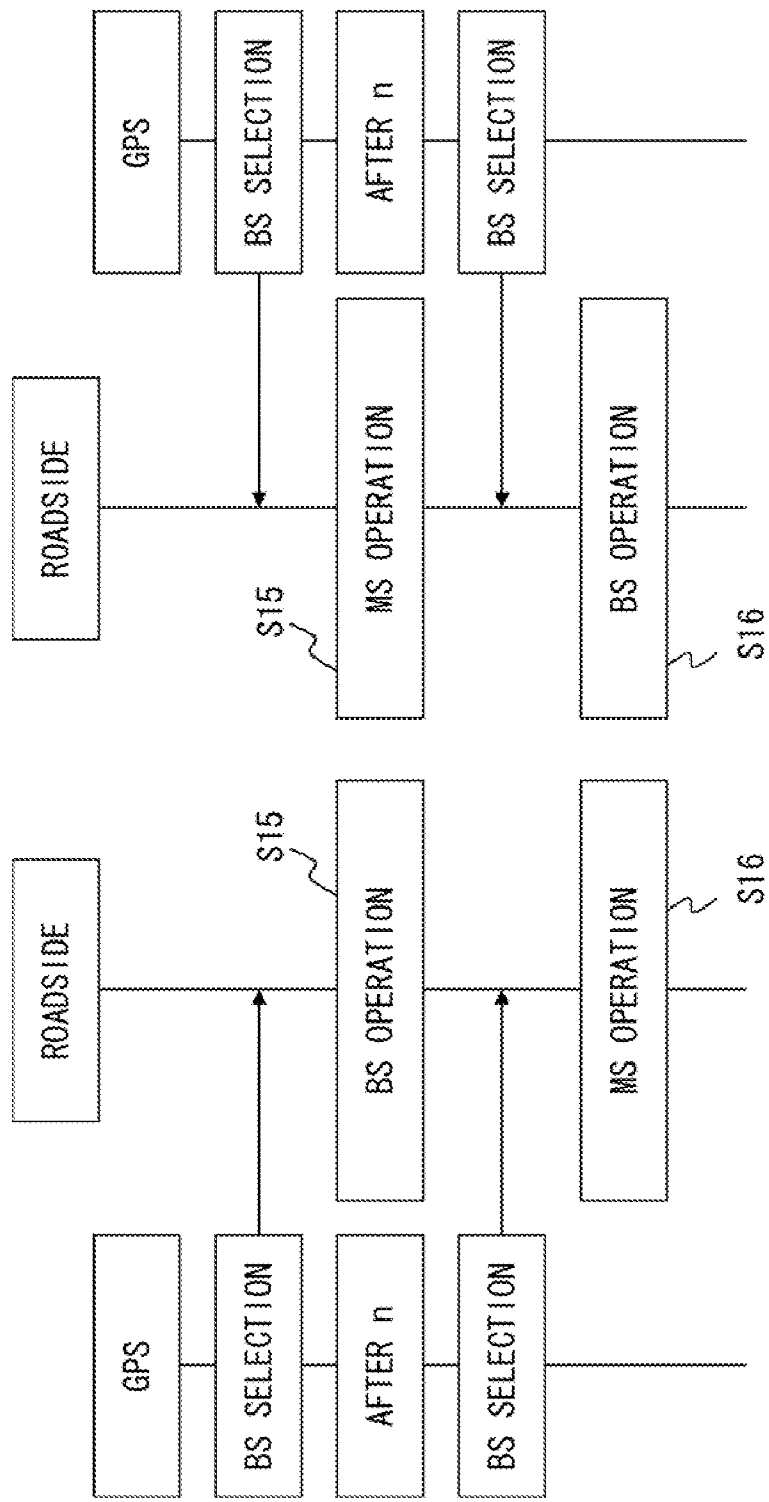
FIG. 7 is a flowchart explaining another embodiment, an embodiment of assignment of the BS and MS operations in road-road communications.

FIG. 7 is a flowchart explaining an embodiment of another assignment of the BS and MS operations in the road-road communications.

Timing signals from a GPS are linked to the operations of the control unit 40, and the control unit 40 is operated while changing the setting values of 1=BS and 0=MS at a constant period. In FIG. 7, at first, the roadside device #1 is set to perform the BS operation and the roadside device #2 is set to perform the MS operation (S15), and after n seconds (n is a value that should be appropriately determined by persons skilled in the art), the operations are switched so that the roadside device #2 performs the BS operation and the roadside device #1 performs the MS operation (S16). If the number of roadside devices is three or more, the roadside device performing the BS operation should be switched cyclically.

Figure 8:
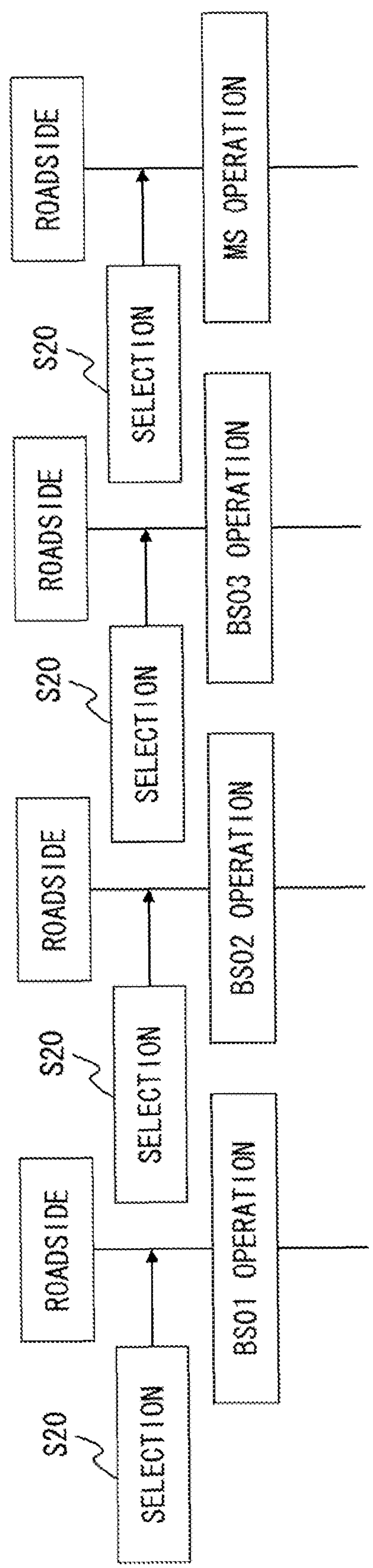
FIG. 8 is a diagram (part 1) explaining an embodiment of a method for assigning a band for road-road communications.

FIG. 8 and FIG. 9 are diagrams explaining an embodiment of a method for assigning a band for the road-road communications.

In the road-road communications, the sub-channels used by each of the roadside devices are assigned in a fixed manner, and the roadside devices are operated as shown in FIG. 9. In other words, as shown in FIG. 8, when plural roadside devices are assigned to the BS operation by the selection signals, at the beginning of road-road communications, the sub-channels to be used in each of the roadside devices are assigned by the selection information (S20), and the roadside devices perform communication by using only the assigned sub-channel (60 through 62) as shown in FIG. 9. As a result, two or more roadside devices can be set to perform the BS operation.

Figure 11:
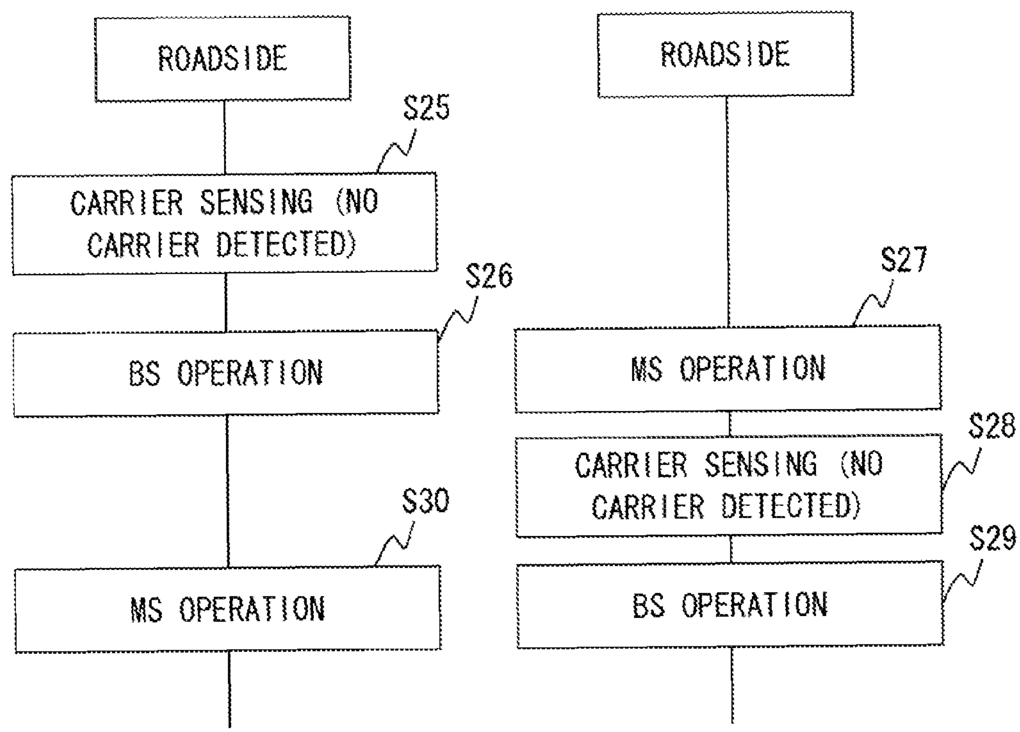
FIG. 11 is a diagram (part 2) explaining an embodiment in which carrier sensing is used for switching of the BS and MS functions.

FIG. 10 and FIG. 11 are diagrams explaining an embodiment in which carrier sensing is used for switching of the BS and MS functions.

In FIG. 10, components that are the same as the components shown in FIG. 2 have the same reference numbers, and explanations of the components are omitted.

A CSMA (Carrier Sense Multiple Access) unit 50 is provided and the integrated MAC unit 11 is notified of a result of carrier sensing in FIG. 10. The CSMA unit 50 receives downlink signals from the RF unit 14, and detects a path exceeding a threshold level. The integrated MAC unit 11 takes control of switching the BS function and the MS function based on the result. Further details of the carrier sensing are provided in IEEE Std 802.11a-1999 (17.3.10.5 CCA sensitivity: CCA: Clear Channel Assessment).

As a result of the carrier sensing, conditions whereby intended sub-channels are in use are defined as below:

receiving a signal of −82 dBm or higher (receiving a preamble); and if the preamble cannot be received, receiving a signal of −42 dBm (−62 dBm+20 dB) or higher.

FIG. 11 is an operation flowchart when the carrier sensing is employed in the NS selection in road-road communications.

First, the roadside device #1 performs carrier sensing (S25). If the roadside device #1 determines that the intended sub-channel is not in use, i.e., no carrier is detected in the sub-channel, the roadside device #1 starts the BS operation (S26). The roadside device #2 performs the MS operation (S27). Next, when starting to perform communications, the roadside device #2 performs the carrier sensing (S28). If no carrier is detected in the intended sub-channel, the roadside device #2 starts the BS operation (S29) and the roadside device #1 starts the MS operation (S30). The result of no carrier being detected indicates that a band intended for the use is not occupied, and therefore a roadside device that does not detect any carrier is operated as BS and can start to perform communications.

Figure 12A:
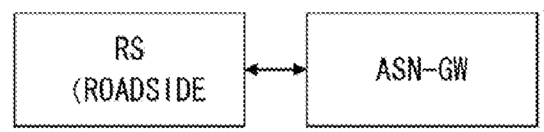
FIGS. 12 A and B are diagrams explaining an embodiment in which instructions as to which roadside device performs the BS operation are provided from an upper layer.
Figure 12B:
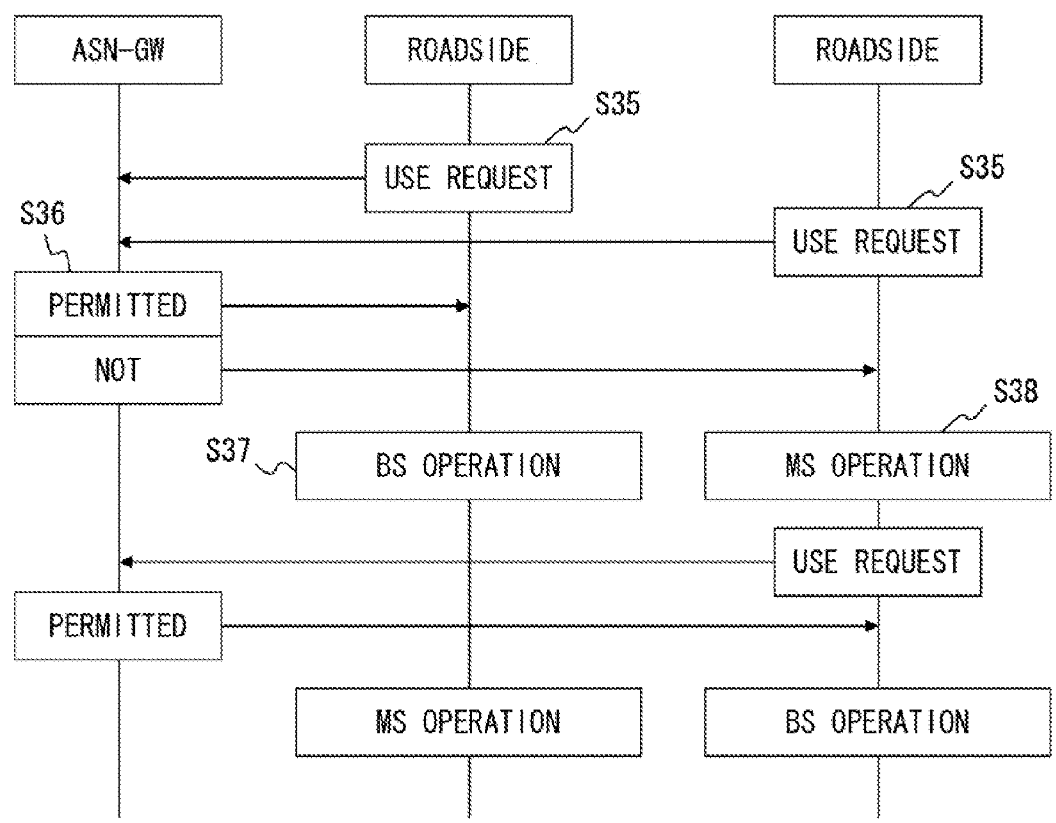

FIGS. 12 A and B are diagrams explaining an embodiment in which instructions as to which roadside device performs the BS operation are provided from an ASN-GW.

An ASN-GW coordinates with the upper layer and relays the communications between BS and MS. In this embodiment, ASN-GW has a permission control added to it, and determines which roadside device is permitted to serve as a master (BS) in accordance with band use requests from the roadside devices (S35). The determination criteria are, for example, significance of transmission information, amount of the information, location where the roadside device is placed, and the receiving end of the transmission. When receiving the requests from each of the roadside devices, the ASN-GW transmits a transmission permission to the applicable roadside device based on the determination criteria (S36). The roadside device that received the permission enters a master mode (BS mode) (S37) and executes the processing. Roadside devices that did not receive the permission operate in a slave mode (MS mode) (S38).

Figure 13:
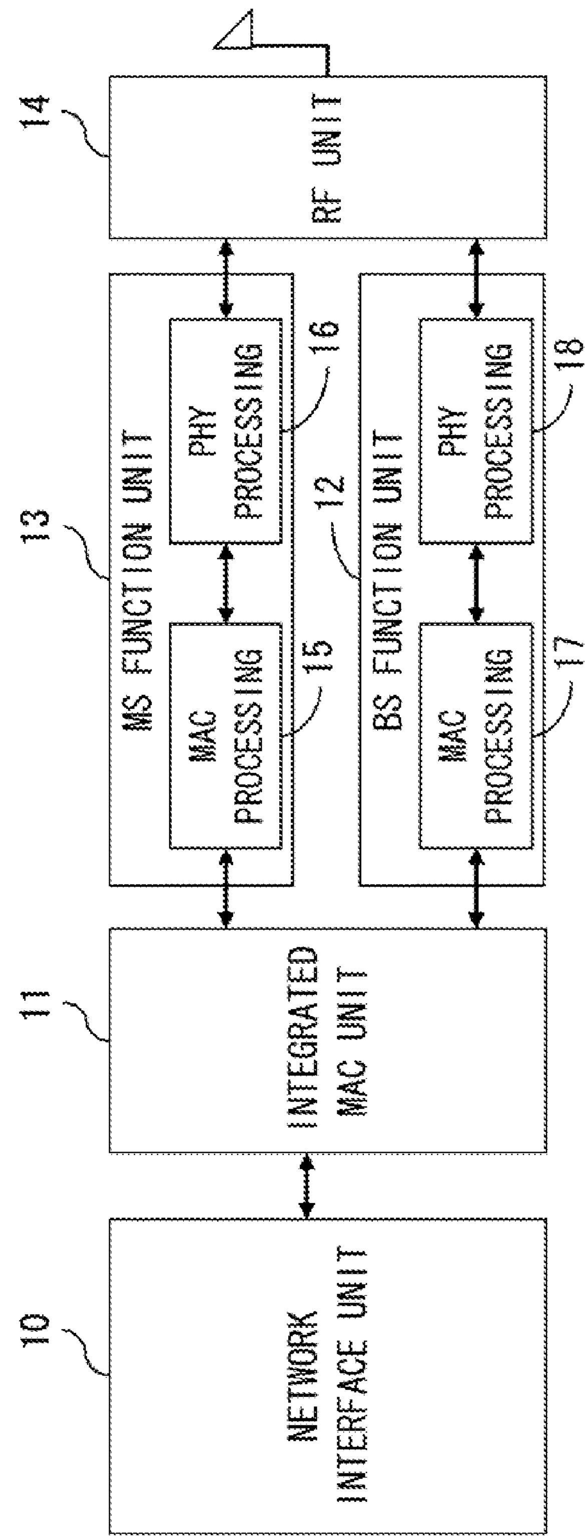
FIG. 13 is a diagram (part 1) explaining an in-vehicle device of the embodiment.

FIG. 13 and FIG. 14 are diagrams explaining an in-vehicle device of the embodiment.

In FIG. 13, components that are the same as the components shown in FIG. 2 have the same reference numbers, and explanations of the components are omitted.

The configuration of the in-vehicle device in FIG. 13 is the same as the roadside device in FIG. 2, and the difference is that the in-vehicle device does not have a GPS. The in-vehicle device basically performs slave operations (MS operation). In the slave mode, information from the roadside devices is received employing the same operation as the operation in the slave mode described in the explanation of FIG. 2, and vehicle information is transmitted. In a case in which there is no roadside device on the periphery, the in-vehicle device performs the carrier sensing. If no carrier is detected, the in-vehicle device enters the master mode (BS operation), and transmits the vehicle information by employing the operations in the master mode described in FIG. 6. Information on in-vehicle devices on the periphery can be received as well. If there are any in-vehicle devices on the periphery that entered the master mode earlier, the preamble signal is transmitted and therefore the in-vehicle device should automatically start the slave operation. As shown in FIG. 14, in a case in which reception of the preamble is lost during the MS operation (slave mode) (S40), the in-vehicle device starts the BS operations (master mode) and performs the communication (S41).

Figure 16:
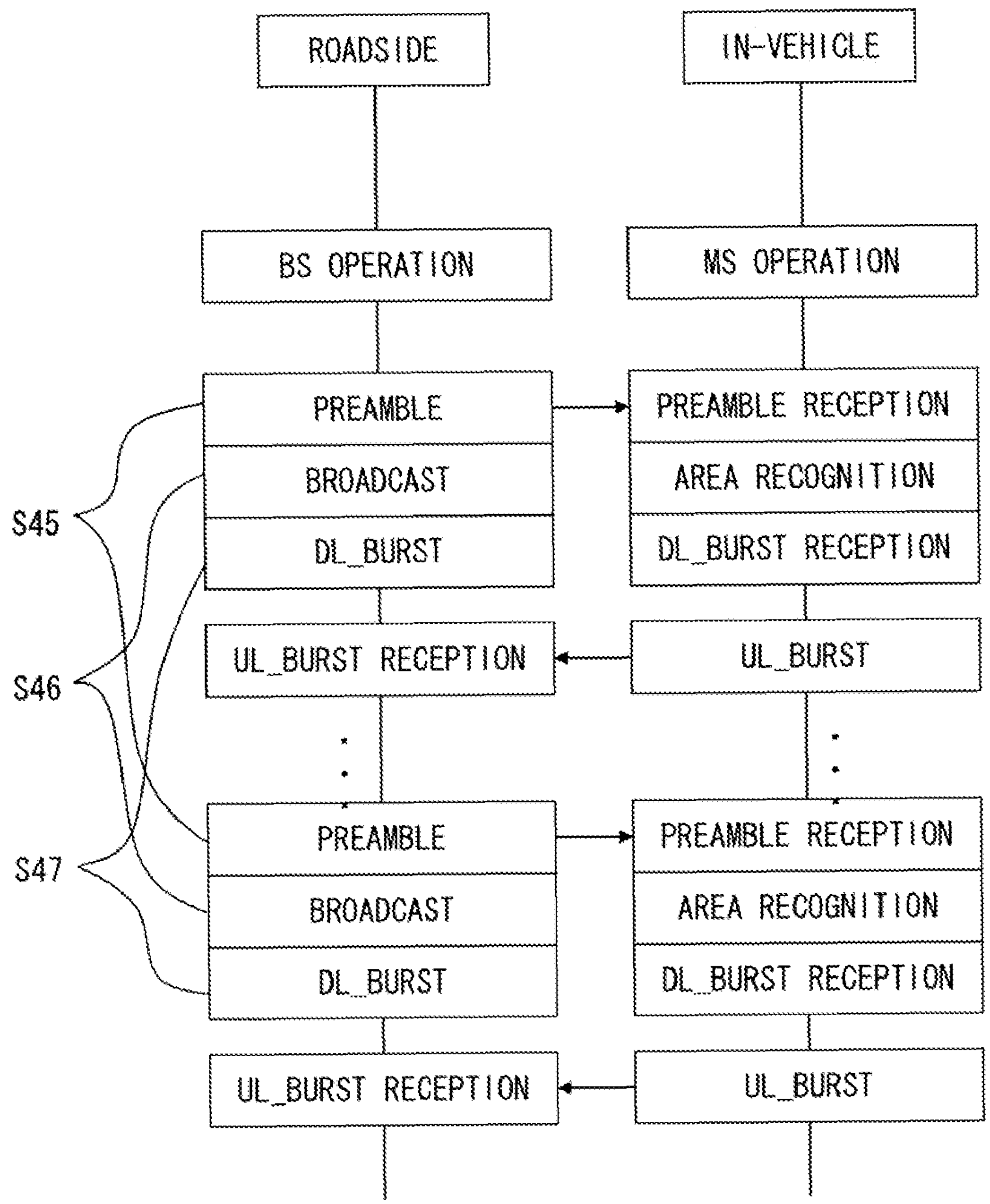
FIG. 16 is a diagram (part 2) explaining the road-vehicle communication in the embodiment.

FIG. 15 and FIG. 16 are diagrams explaining the road-vehicle communication in the embodiment.

FIG. 15 illustrates communications between a single roadside device and plural in-vehicle devices. FIG. 16 is a flowchart of the road-vehicle communications.

The roadside device 65 realizes the BS operation by the configuration shown in FIG. 2. The in-vehicle device realizes the MS operation by the configuration shown in FIG. 13. The roadside device constantly transmits preamble (S45), broadcast (S46) and DL_burst signals (S47) via down link by the BS function operation in the master mode. Information from outside of the roadside device is included in the DL_burst signal. Information from the in-vehicle device is transmitted via up-link and the roadside device obtains the in-vehicle information by receiving the UL_burst signal. The in-vehicle device constantly receives various signals in the down-link by the MS function operation in the slave mode, and obtains synchronization, area information (information on the band used such as the sub-carrier used in the communication and the communication time period) and roadside device information. By transmitting the in-vehicle information with the UL_burst signal, roadside devices are notified of the in-vehicle information and communication can be realized.

Figure 17:
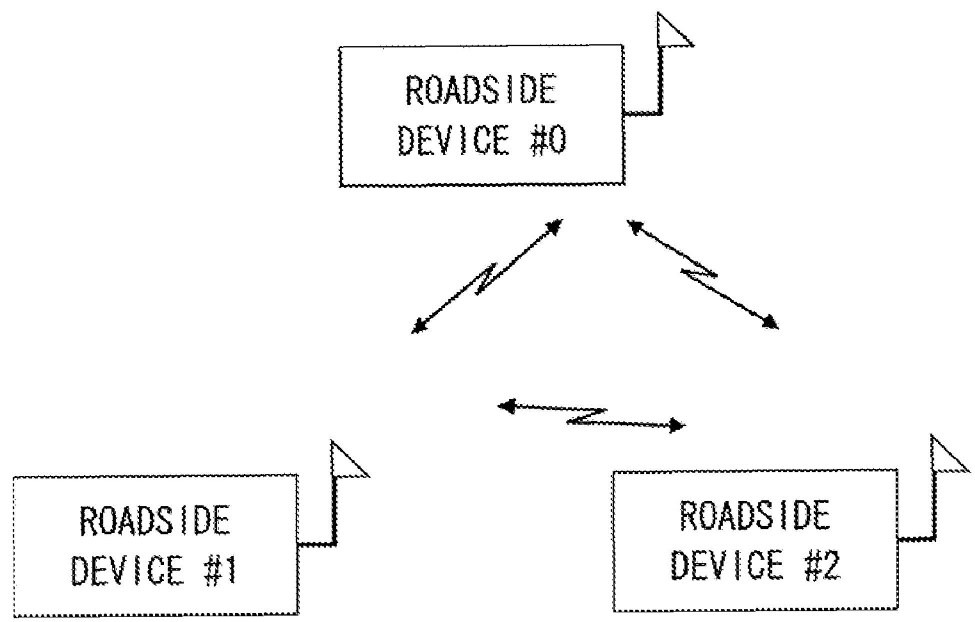
FIG. 17 is a diagram (part 1) explaining an embodiment of road-road communications.
Figure 18A:
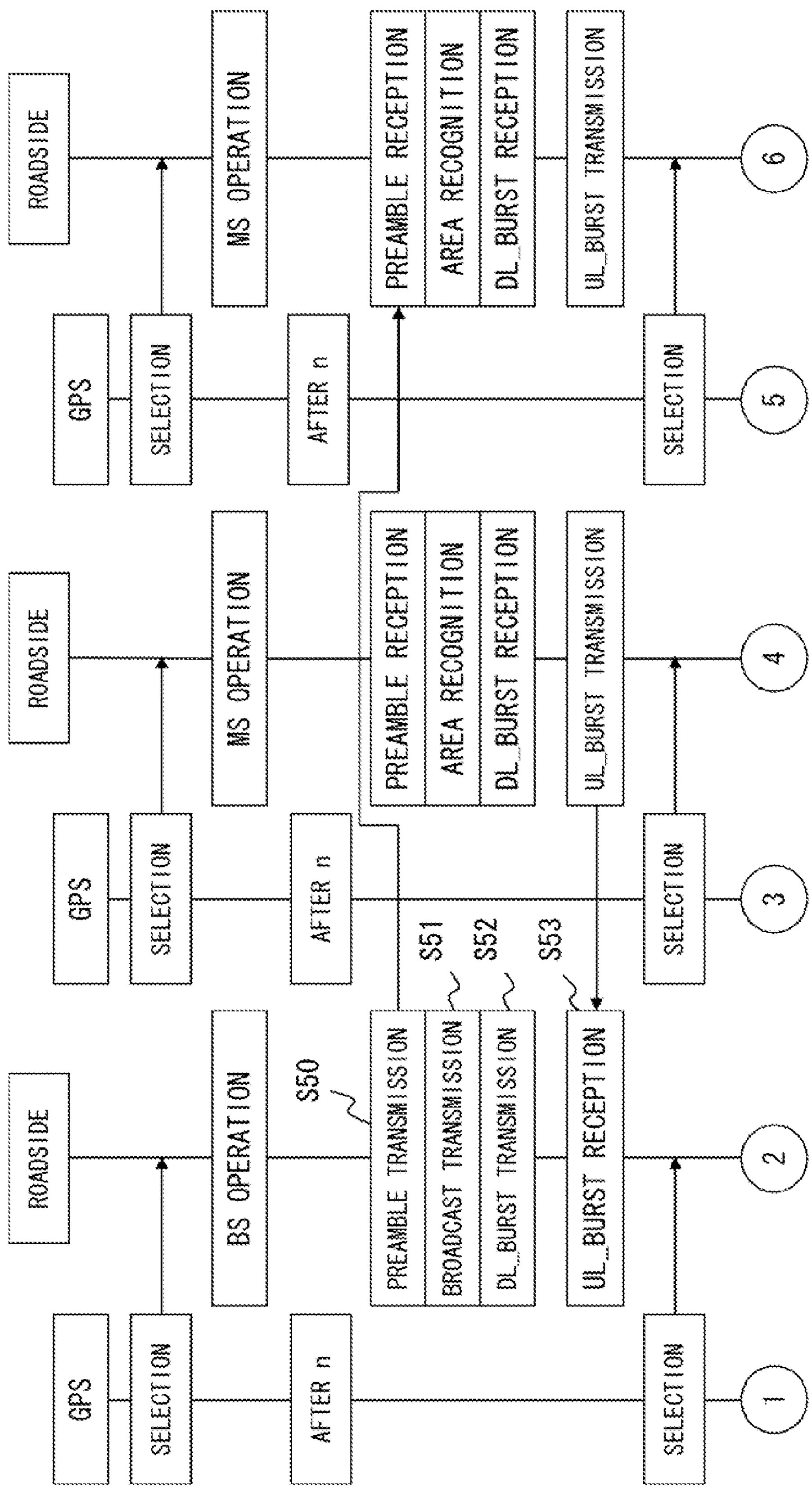
FIG. 18 is a diagram (part 2) explaining an embodiment of road-road communications.
Figure 18B:
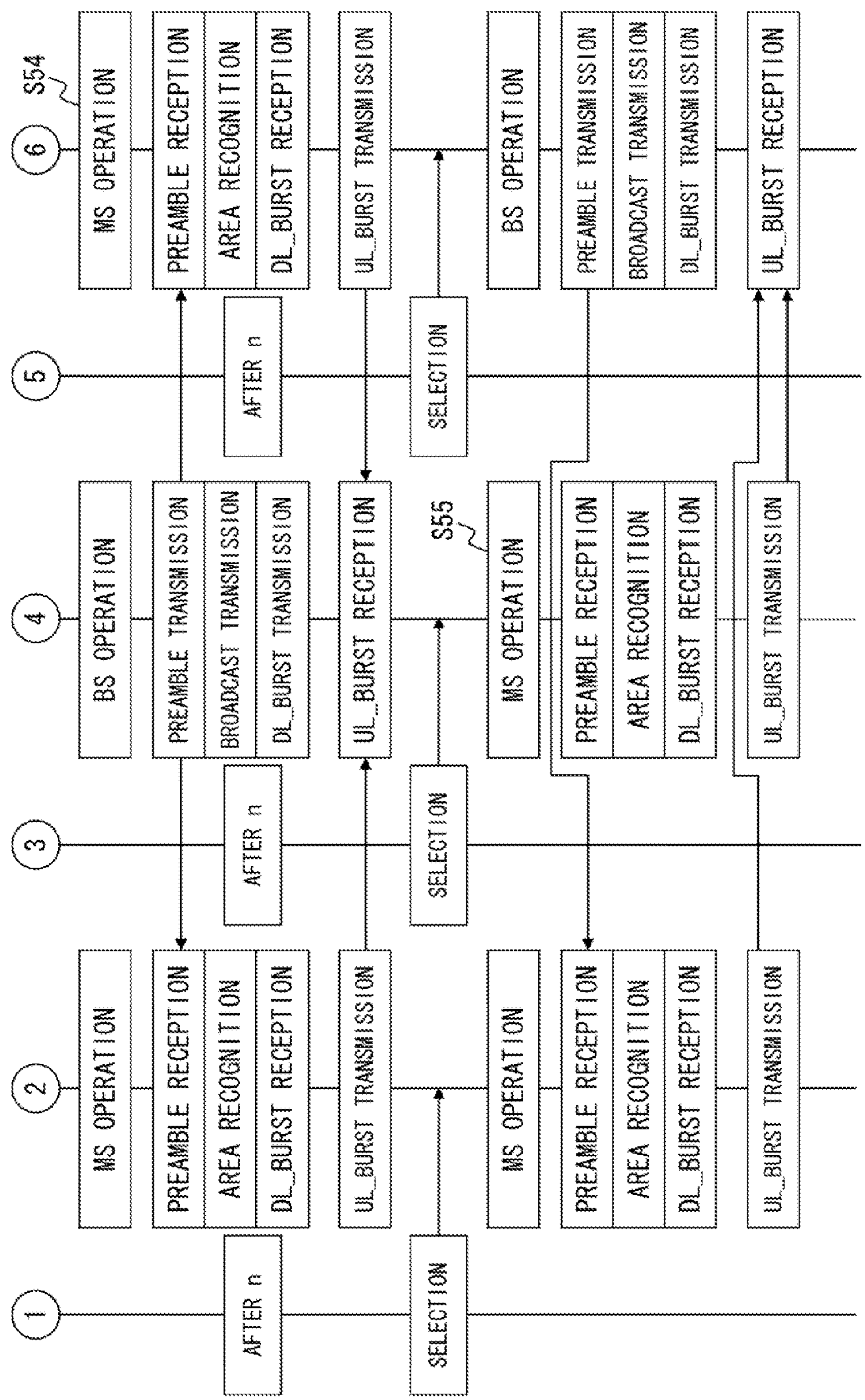
Figure 19:
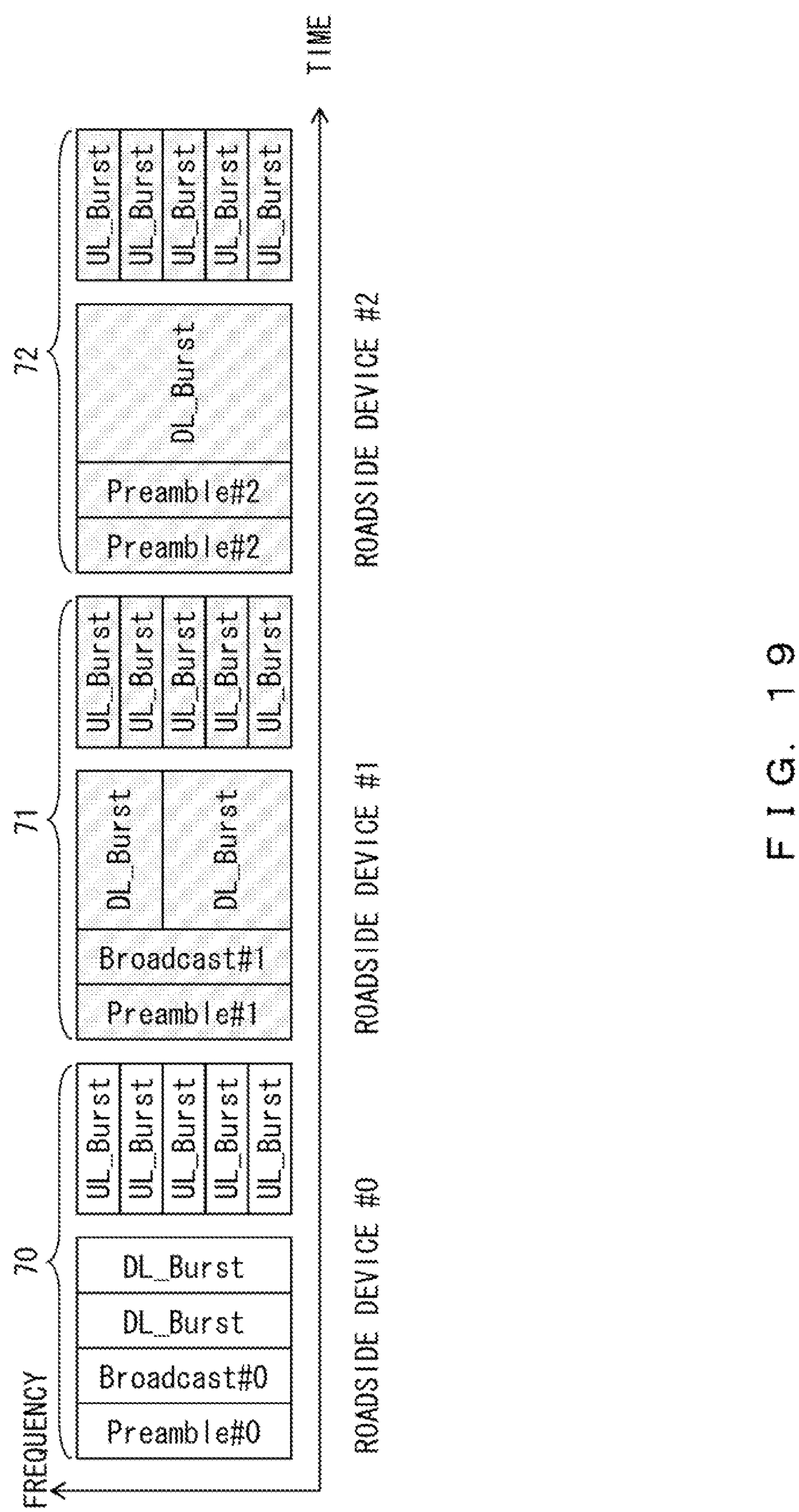
FIG. 19 is a diagram (part 3) explaining an embodiment of road-road communications.

FIG. 17 through FIG. 19 are diagrams explaining an embodiment of road-road communication.

FIG. 17 illustrates an image of the road-road communication, FIG. 18 shows a flowchart of the road-road communication, and FIG. 19 shows an example of band use in the road-road communication.

The roadside device realizes the BS operation and the MS operation by the configuration shown in the embodiment of FIG. 2. When there are three roadside devices #0, #1 and #2, for example, all roadside devices are synchronized with each other by the GPS. Consequently, each of the roadside devices can obtain the time to enter the master mode at an initially designated time period. For the rest of the time period, the roadside devices are in the slave mode, and as a result, collision of use of the frequency can be avoided. The roadside device #0 in the master mode transmits the preamble (S50), broadcast (S51), and DL_burst signals (S52) to the roadside devices #1 and #2 on the periphery via the down-link by using the BS function. Information from outside of the roadside device #0 is included in the DL_burst signal. Information from the roadside device #1 and the roadside device #2 is transmitted via the up-link, and the roadside device #0 obtains the information of the roadside device #1 and the roadside device #2 by receiving the UL_burst signal (S53). The roadside devices #1 and #2 receive various signals in the down-link by the MS function operation in the slave mode, and obtain synchronization, area information, and roadside device #0 information. By transmitting information of the roadside devices #1 and #2 with the UL_burst signal, the roadside device #0 is notified of the information. At a predetermined time, the roadside device #1 or the roadside device #2 enters the master mode (S54, S55), and communication can be realized. In the present embodiment, road-road communication can be realized only by the roadside devices.

In FIG. 18, similarly to FIG. 7, communication between the roadside device performing the BS operation and the roadside device performing the MS operation is realized by switching a roadside device to start the BS operation (master mode) at a predetermined time period. The processing in the BS operation and the processing in the MS operation are the same as the processing shown in FIG. 6. FIG. 19 shows an example of assignment of communication bands. When a roadside device becomes a master, all sub-channels are used for communication. However, the master is switched over time, and the band in use is divided as time passes and assigned to each of the roadside devices (70 through 72).

Figure 20:
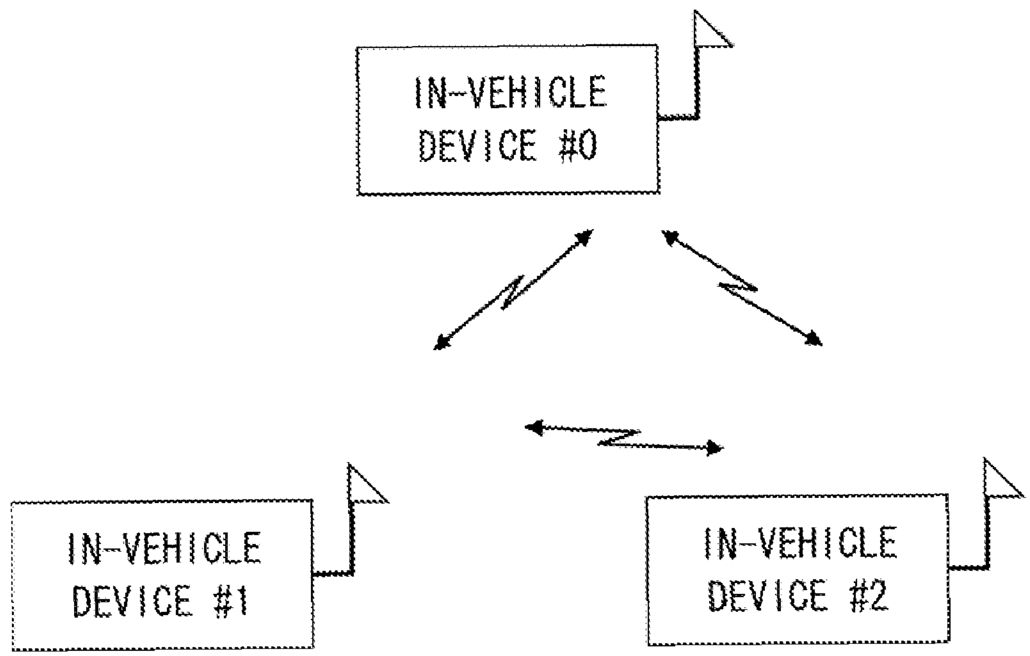
FIG. 20 is a diagram (part 1) explaining an embodiment of vehicle-vehicle communications.
Figure 21A:
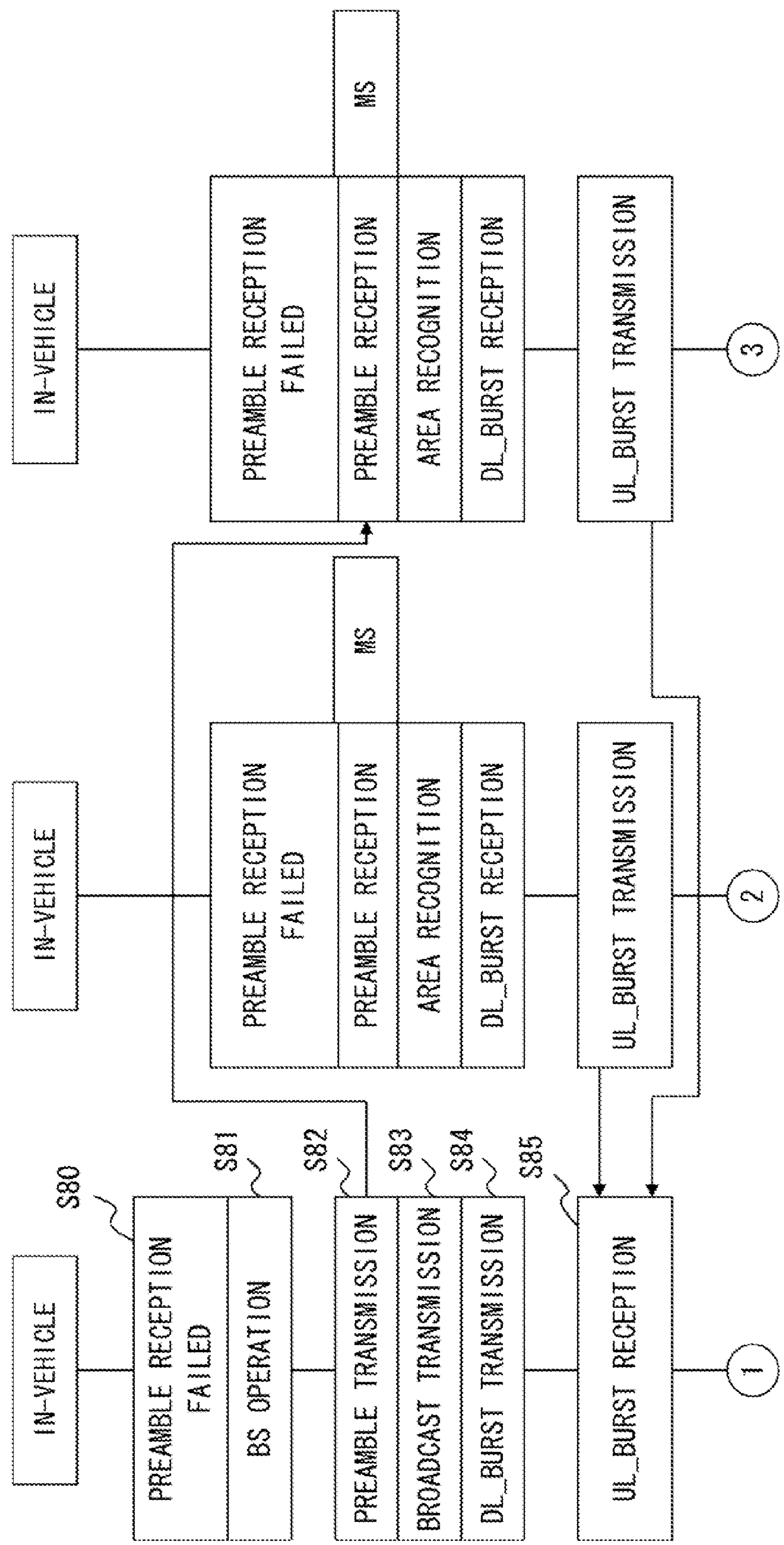
FIG. 21 is a diagram (part 2) explaining an embodiment of vehicle-vehicle communications.
Figure 21B:
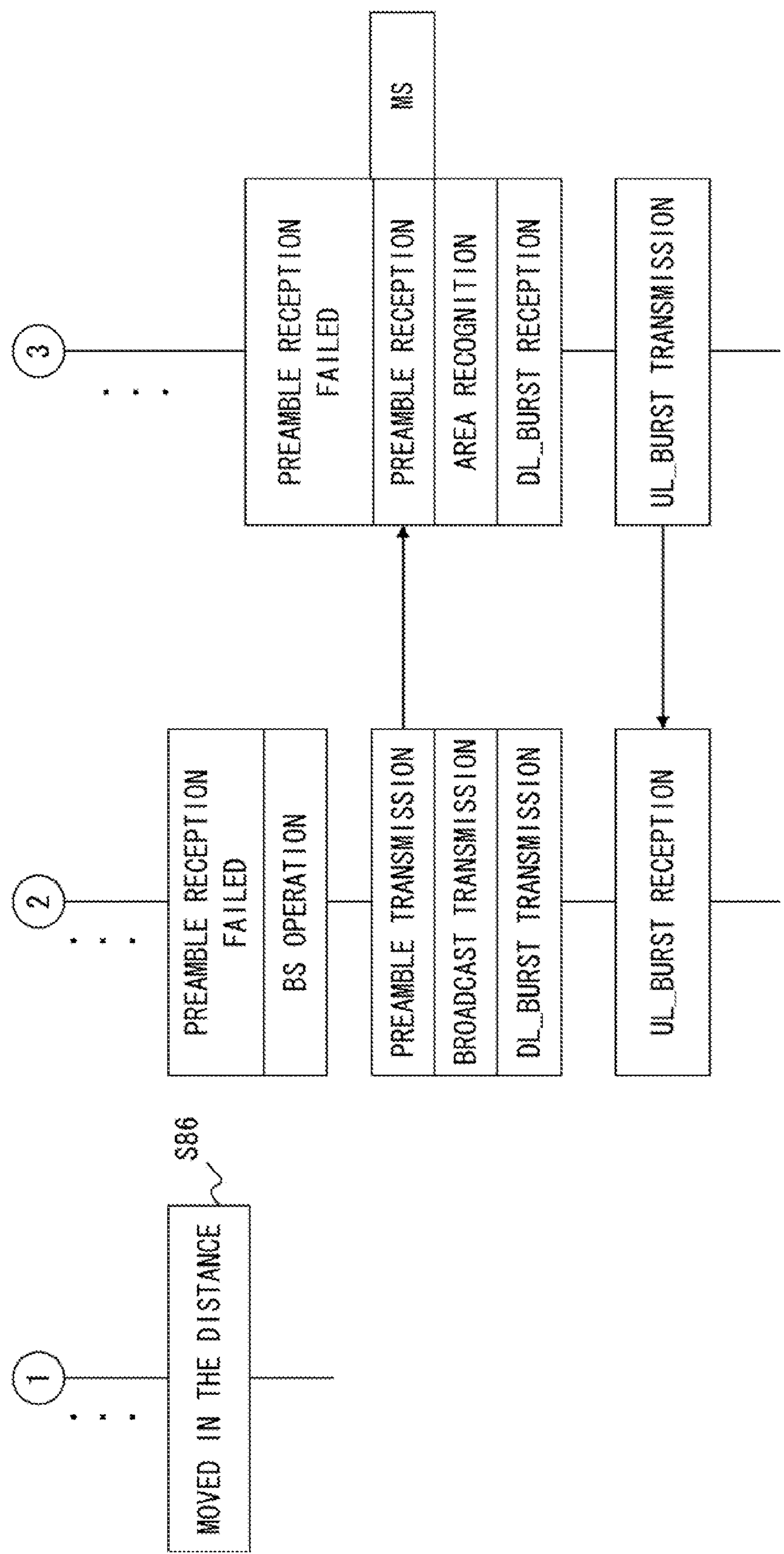

FIG. 20 and FIG. 21 are diagrams explaining the embodiment of vehicle-vehicle communication. FIG. 21 is a flowchart of vehicle-vehicle communication. An in-vehicle device realizes the BS operation and the MS operation by the configuration shown in FIG. 13. When there are plural in-vehicle devices, #0, #1, and #2, for example, these in-vehicle devices cannot synchronize with each other on the basis of the preamble without a roadside device. In such a case, as an example, when the in-vehicle device #0 detects no preamble first among the in-vehicle devices #0 through #2 (S80), the in-vehicle device #0 immediately enters the master mode (S81). The in-vehicle device #0 in the master mode transmits the preamble (S82), broadcast (S83) and DL_burst signals (S84) to the in-vehicle device #1 and the in-vehicle device #2 via the down-link by using the BS function. Information from outside of the in-vehicle device #0 is included in the DL_burst signal (S84). Information from the in-vehicle device #1 and the in-vehicle device #2 is transmitted via the up-link, and the in-vehicle device #0 can obtain the information of the in-vehicle device #1 and the in-vehicle device #2 by receiving the UL_burst signal (S85). The in-vehicle devices #1 and #2 receive various signals in the down-link by the MS function operation in the slave mode, and obtain synchronization, area information and information of the in-vehicle device #0. By transmitting information of the in-vehicle devices #1 and #2 with the UL_burst signal, the in-vehicle device #0 is notified of the information of the in-vehicle devices #1 and #2. When the in-vehicle device #0 moves and has gone far (S86) and the in-vehicle devices #1 and #2 cannot receive the preamble, the in-vehicle device #1, for example, enters the master mode to continue to realize the communications.

What is claimed is:

1. An intelligent transport (IT) system in which roadside devices placed at the side of a road and in-vehicle devices placed in vehicles exchange information by employing a wireless communication technique using communication apparatuses provided both in each of the roadside devices and in each of the in-vehicle devices, each of the communication apparatuses comprising:

an interface which receives and/or sends an information signal between the corresponding device and the remaining devices; and a controller which switches operations of the communication apparatus to act as either a base station or a mobile station and processing the information signal received and/or sent between the corresponding device and the remaining devices, the controller of a given device operating the corresponding communication apparatus as the base station and the controllers of the remaining devices operating the corresponding communication apparatuses as mobile stations.

2. The IT system according to claim 1, wherein the communication apparatus provided at one of the roadside devices is operated as the base station.

3. The IT system according to claim 1, wherein the communication apparatus provided at each of the roadside devices further comprises a timer, and the timer causes the corresponding roadside device to operate as the base station at predetermined time periods.

4. The IT system according to claim 1, the communication apparatus provided in each of the in-vehicle devices further comprising a detector which detects that a carrier wave of a radio wave with a certain bandwidth has been received, wherein one of the communication apparatuses in a corresponding in-vehicle device operates as the base station based on a carrier wave either being received or not being received.

5. The IT system according to claim 1, wherein the IT system comprises a network including a communication controller and a gateway as a network component, and a request from the gateway of the network using the wireless communication technique is made to the communication controller to determine a particular roadside device among the roadside devices operating as the base station.

6. The IT system according to claim 1, wherein the wireless communication technique is a communication technique using a plurality of sub-carriers, and when a plurality of the roadside devices are designated so that the communication apparatuses corresponding to the plurality of the roadside devices operate as the base station, data of the communication apparatuses corresponding to the plurality of the roadside devices are assigned with respective time periods.

7. The IT system according to claim 1, wherein the wireless communication technique is a communication technique using a plurality of sub-carriers, and when a plurality of the roadside devices are designated so that the communication apparatuses corresponding to the plurality of the roadside devices operate as the base station, a communication band for one of the plurality of the roadside devices is assigned with part of the plurality of sub-carriers.

8. The IT system according to claim 1, wherein the wireless communication technique is WiMAX.

* * * * *